US012579387B2

(12) United States Patent
Ruiter et al.

(10) Patent No.: US 12,579,387 B2
(45) Date of Patent: Mar. 17, 2026

(54) SYSTEM AND METHOD FOR ANIMAL MOTION DETECTION

(71) Applicant: Unified Information Devices, LLC, Wilmington, DE (US)

(72) Inventors: Matthew Ruiter, Deerfield, IL (US); Craig Jordan, Lake Villa, WI (US)

(73) Assignee: Unified Information Devices, LLC, Wilmington, DE (US)

( * ) Notice: Subject to any disclaimer, the term of this patent is extended or adjusted under 35 U.S.C. 154(b) by 104 days.

(21) Appl. No.: 18/237,104

(22) Filed: Aug. 23, 2023

(65) Prior Publication Data

US 2023/0394255 A1     Dec. 7, 2023

Related U.S. Application Data

(63) Continuation-in-part of application No. 18/198,853, filed on May 18, 2023, now Pat. No. 12,026,575, which is a continuation of application No. 17/365,603, filed on Jul. 1, 2021, now Pat. No. 11,694,043, which is a continuation of application No. 16/664,488, filed on Oct. 25, 2019, now Pat. No. 11,080,495.

(Continued)

(51) Int. Cl.
*G06K 7/10* (2006.01)
*A01K 1/03* (2006.01)
(Continued)

(52) U.S. Cl.
CPC .......... *G06K 7/10297* (2013.01); *A01K 1/031* (2013.01); *A01K 11/007* (2013.01);
(Continued)

(58) Field of Classification Search
CPC .... A01K 1/031; A01K 11/006; A01K 11/007; A01K 11/008; A01K 29/005;
(Continued)

(56) References Cited

U.S. PATENT DOCUMENTS 10,439,287 B2    10/2019  Ashrafi
11,080,495 B2 *   8/2021  Ruiter .............. G06K 19/07758
(Continued)

*Primary Examiner* — Thien M Le
(74) *Attorney, Agent, or Firm* — Troutman Pepper Locke LLP; Christopher J. Capelli

(57) ABSTRACT

A system and method for identifying and monitoring passage of a plurality of animals in a passageway. The system includes a computer monitoring device having a processor and memory, and a detection device, communicatively coupled to the computer monitoring device. The detection device is positioned in proximity to an animal passageway. The detection device includes an antenna element configured to detect identification data from a respective detection component respectively associated with each of the plurality animals when located in close proximity to the passageway. The detected identification data includes a unique ID associated with the animal wherein each detection component consists of a capsule device configured to be located internal of an animal. The computer monitoring device is configured to receive the detected identification data of an animal from the detection device so as to record in a database the detected animal's unique ID in correlation with a date/time stamp of the animal's detected close proximity to the passageway.

20 Claims, 8 Drawing Sheets

Related U.S. Application Data

(60) Provisional application No. 62/750,367, filed on Oct. 25, 2018.

(51) Int. Cl.

| | |
|---|---|
| *A01K 11/00* | (2006.01) |
| *A01K 29/00* | (2006.01) |
| *G01K 13/20* | (2021.01) |
| *H01Q 1/22* | (2006.01) |
| *H01Q 21/28* | (2006.01) |

(52) U.S. Cl.
CPC ............ *A01K 29/005* (2013.01); *G01K 13/20* (2021.01); *H01Q 1/2216* (2013.01); *H01Q 21/28* (2013.01)

(58) Field of Classification Search
CPC .... G01K 1/024; G01K 13/20; G06K 7/10297; H01Q 1/2216; H01Q 21/06; H01Q 21/28; H01Q 3/24
See application file for complete search history.

(56) References Cited

U.S. PATENT DOCUMENTS

| | | | | |
|---|---|---|---|---|
| 2002/0010390 A1* | 1/2002 | Guice | ................... | G16H 50/20 |
| | | | | 600/300 |
| 2008/0128486 A1* | 6/2008 | Lowe | ................... | A01K 67/02 |
| | | | | 235/492 |
| 2009/0102607 A1* | 4/2009 | Mejia | ................... | H04Q 9/00 |
| | | | | 340/10.1 |
| 2015/0034208 A1* | 2/2015 | Chang | ................... | B05B 15/55 |
| | | | | 141/2 |
| 2015/0318624 A1 | 11/2015 | Schantz et al. | | |
| 2016/0089301 A1* | 3/2016 | Chang | ................... | B65B 3/10 |
| | | | | 141/90 |
| 2016/0175091 A1* | 6/2016 | Van Heugten | ........... | A61F 2/14 |
| | | | | 623/6.22 |
| 2016/0260161 A1 | 9/2016 | Atchley et al. | | |
| 2016/0321480 A1* | 11/2016 | Hamlin | ................... | G16Z 99/00 |
| 2016/0349352 A1 | 12/2016 | Karani et al. | | |
| 2016/0366858 A1 | 12/2016 | Seltzer et al. | | |
| 2017/0013802 A1 | 1/2017 | Zimmerman et al. | | |
| 2017/0049074 A1 | 2/2017 | Wilkinson et al. | | |
| 2017/0055496 A1 | 3/2017 | McHugh et al. | | |
| 2017/0122546 A1 | 5/2017 | Abbott et al. | | |
| 2017/0332602 A1 | 11/2017 | Fenrich et al. | | |
| 2017/0372583 A1 | 12/2017 | Lamkin et al. | | |
| 2018/0035256 A1 | 2/2018 | Prevatt | | |
| 2018/0085038 A1* | 3/2018 | Chen | ................... | A61B 5/14503 |
| 2018/0353276 A1* | 12/2018 | Hart | ................... | A01K 5/01 |
| 2019/0156079 A1 | 5/2019 | Espinosa | | |
| 2019/0166802 A1 | 6/2019 | Seltzer et al. | | |
| 2019/0336041 A1 | 11/2019 | Geissler et al. | | |
| 2021/0112781 A1* | 4/2021 | Crouthamel | ......... | A01K 29/005 |

* cited by examiner

COMPUTER MONITOR DEVICE 450

SYSTEM AND METHOD FOR ANIMAL MOTION DETECTION

CROSS REFERENCE TO RELATED APPLICATIONS

This application is a Continuation-in-Part Applications of U.S. patent application Ser. No. 18/198,853 filed May 18, 2023, which is a Continuation-in-Part Application of U.S. patent application Ser. No. 17/365,603 filed Jul. 1, 2021, which is a Continuation Application of U.S. Pat. No. 11,080, 495 filed Oct. 25, 2019, which claims priority to U.S. Patent Application Ser. No. 62/750,367 filed Oct. 25, 2018, which is incorporated herein by reference in its entirety.

FIELD OF THE INVENTION

The illustrated embodiments relate to a method and apparatus for detecting the motion and temperature of animal, and more particularly to identifying and monitoring passage of a plurality of animals in a passageway.

BACKGROUND OF THE INVENTION

In animal motion activity measurement, the engineering techniques are usually adopted to measure the changes of animal motion activity in a limited space, but most of the developed automatic methods for animal activity measurement could not get the whole data of the animal motion activity patterns and tracks of movement at a time.

To record the animals moving path is of considerable importance and is very useful for many applications in behavior and neurophysiological studies. From the moving path, many useful variables of motor behavior could be analyzed such as total distance traveled, average speed, rest time, turning, and pattern of movement. A number of automatic measuring systems have been developed and reported and also available commercially. Various detection methods were offered. These include the use of video camera and photocell methods. The video camera system, however, has some drawbacks; for example, measurement needs proper illumination and sharp contrast between animal and background is required, as well as prolonged human monitoring of video recordings.

It is also to be appreciated that current systems do not allow for the addition of recording core animal body temperatures combined with animal location monitoring tracking. This is principally because the size needed for a tracking device for recording both animal body core temperature and location together in one device was not achievable due to the miniature size required for such a tracking device while still providing high quality of an emitted tracking signal and speed of reading devices receiving the information It is to be further appreciated that current systems also do not permit the simultaneous tracking and recording/reading of multiple animals in a designated area using a single antenna array, for animal tracking, when a low frequency (LF) tracking chip is associated with an animal for movement tracking. This is principally because of the collision effect that occurs between multiple LF chips when all are simultaneously present in a designated area covered by a single antenna array. Typically, in this scenario, the antenna array only tracks the strongest signal (e.g., RFID signal) received from a single LF chip amongst all the LF chips simultaneously present in the designated region. Thus, it is desirable to provide a system capable of simultaneously tracking multiple animals, which also preferably includes their temperature recordings, when the multiple animals are simultaneously present in a designated area of a confined space (e.g., a cage).

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, an animal (e.g., rodent) is described in which a miniaturized sensor (e.g., a capsule) is configured to be preferably implanted under the skin layer of an animal operable to record core body temperatures and animal movement, preferably via RFID. In an illustrated embodiment, a multiplexed RFID reader is coupled to an antenna array for preferably detecting and monitoring a small implantable Low Frequency (LF) programmable microchip provided in an implantable capsule device. A computer tracking system is preferably coupled to the multiplexed RFID reader and is configured and operable to perform animal identification and core body temperature determination/recordation.

In another aspect, a computer system and method are described for identifying and monitoring animals in a confined space in which a tracking apparatus is provided having a plurality of antenna arrays in proximity to a confined space. One or more animals to be disposed in the confined space are associated with a detection component operable to identify and detect a core body temperature of an animal it is associated with when detected by the tracking apparatus. Data is received in a computer monitor system from a detection component when detected by the tracking apparatus in the confined space. The received data identifies an animal in correlation with its motion and temperature data. Real-time position and core body temperature of a detected animal is determined while the animal is disposed in the confined space by analysis of the received data in the computer monitor system. In further aspects, a UI may be generated on a display associated with the computer monitor indicating the position of each detected animal in the cage in association with its individual identifying information. Additionally, the computer monitor system may generate motion and temperature profile data in the computer monitor system for each identified animal in the cage for a prescribed period of time.

In yet another aspect, provided is a computer system and method for identifying and monitoring a plurality of animals simultaneously located in a same individual region of a confined space. A tracking apparatus is provided in proximity to the confined space that defines a plurality of separate individual tracking regions for the confined space. Each of a plurality of animals to be disposed in the confined space is associated respectively with a detection component operable to identify and detect a temperature of an animal it is associated with when detected by the tracking apparatus. Data is received in a computer monitor system from a detection component when detected by the tracking apparatus in the confined space wherein the received data includes motion and temperature data relating to an animal when located in the confined space. The tracking apparatus detects multiple animals simultaneously located in an individual tracking region. Utilizing the received data associated with an animal in the confined space, an animal's motion and temperature data is correlated to an individual tracking region an animal is located within.

In yet another aspect, provided is a system and method for identifying and monitoring passage of a plurality of animals in a passageway. The system includes a computer monitoring device having a processor and memory, and a detection device, communicatively coupled to the computer monitoring device. The detection device is positioned in proximity to an animal passageway. The detection device includes an antenna array configured to detect identification data from a respective detection component respectively associated with each of the plurality animals when located in close proximity to the passageway. The detected identification data includes a unique ID associated with the animal wherein each detection component consists of a capsule device configured to be located internal of an animal. The computer monitoring device is configured to receive the detected identification data of an animal from the detection device so as to record in a database the detected animal's unique ID in correlation with a date/time stamp of the animal's detected close proximity to the passageway.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
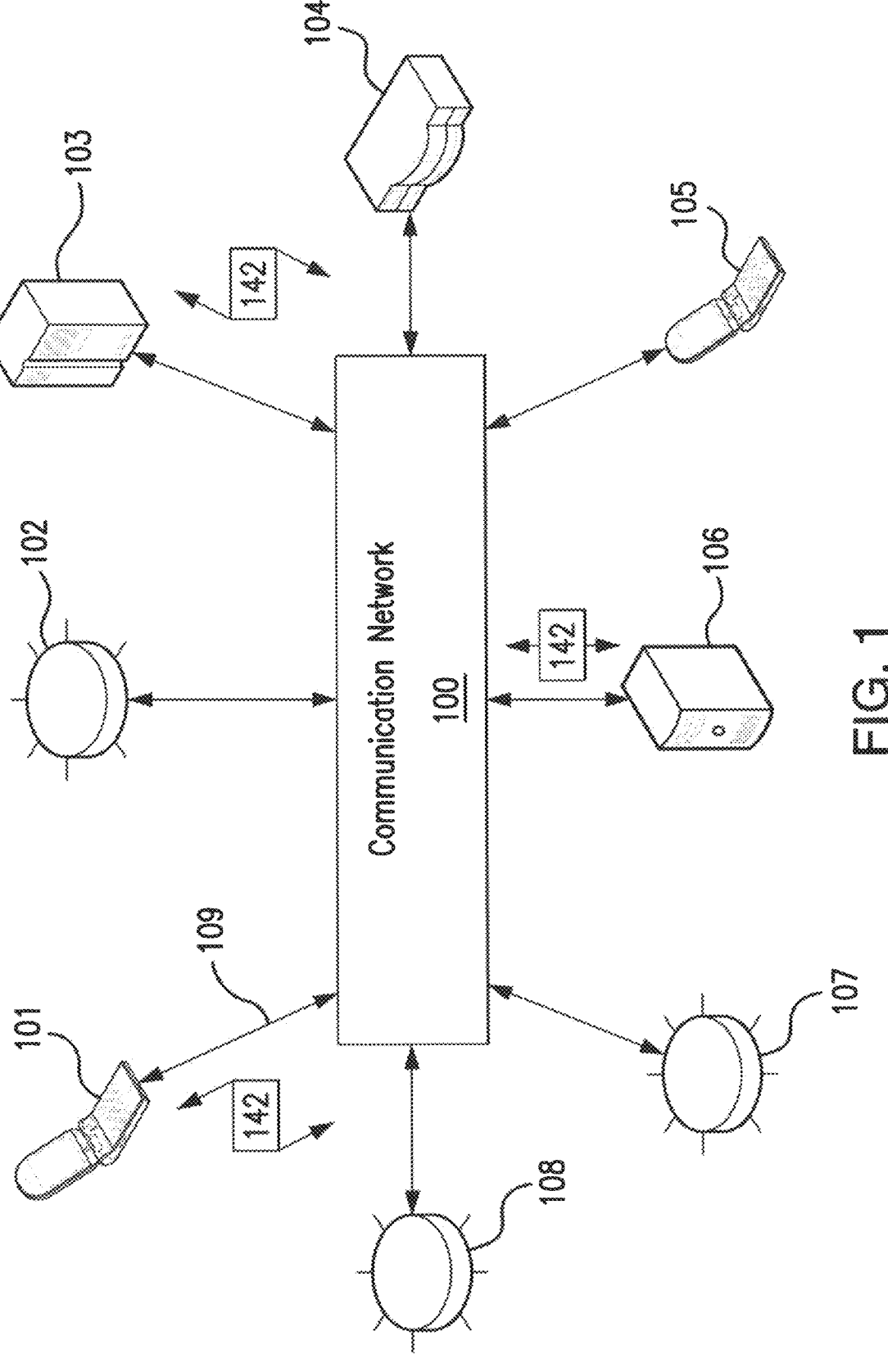
FIG. 1 depicts an example communication network used with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary computer network 100 in which below illustrated embodiments may be implemented.

It is to be understood a computer network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example computer network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Computer program instructions may be provided to a processor of a computer apparatus (e.g., an animal computer tracking system), or other programmable data processing apparatus to produce a machine, such that the instructions, which execute via the processor of the computer or other programmable data processing apparatus, create means for implementing the functions/acts specified in the flowchart and/or block diagram block or blocks.

It is to be appreciated that the computer network 100 may be an integrated component of the data management system illustrated and described in commonly assigned pending U.S. patent application Ser. No. 14/929,823, the contents of which are incorporated by reference herein in its entirety.

Figure 2:
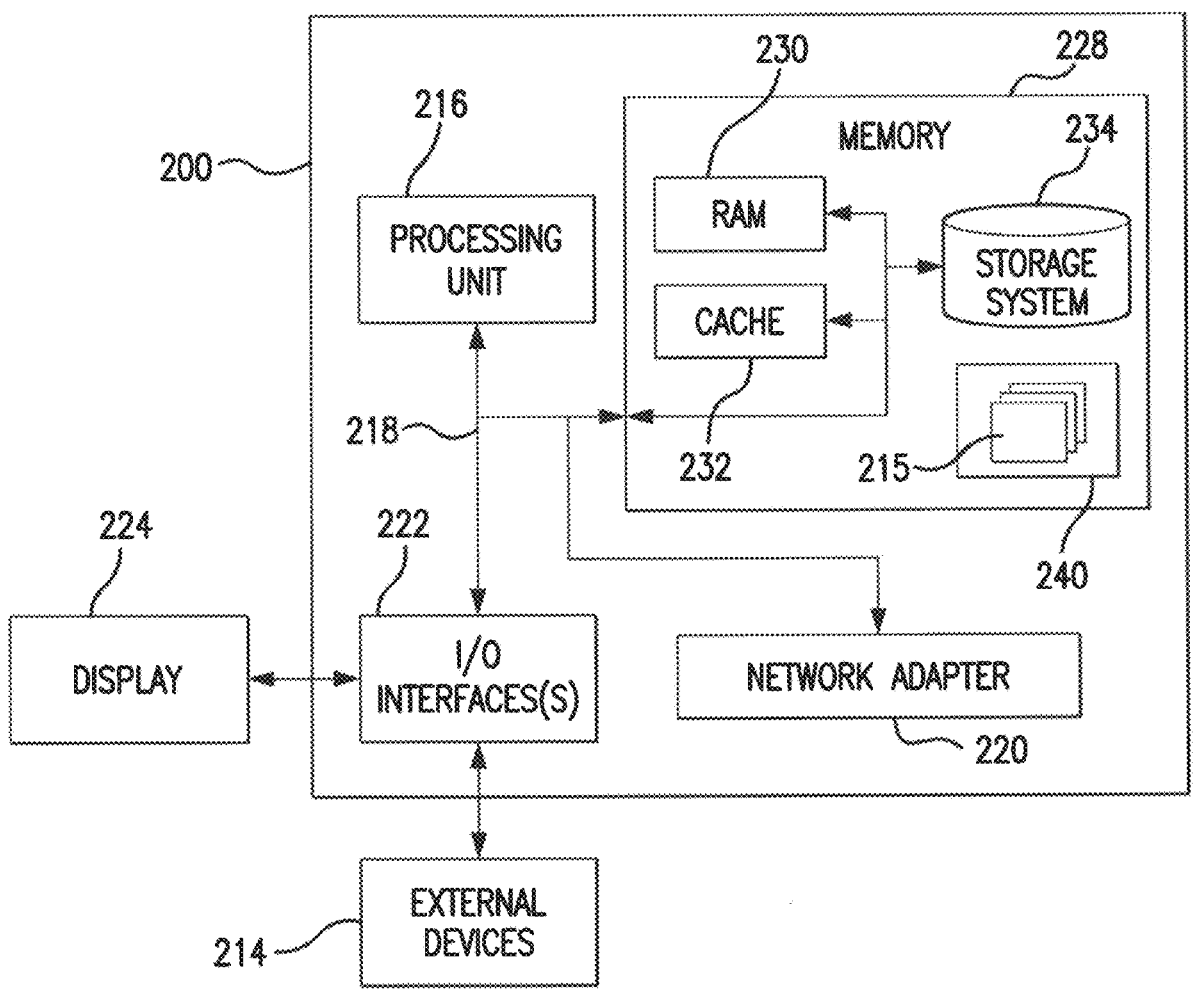
FIG. 2 depicts an example network device/node used with an illustrated embodiment.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a special purpose computing device, components of which are to be understood to be included the in below described animal tracking system 450 in accordance with the illustrated embodiments. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Figure 3:
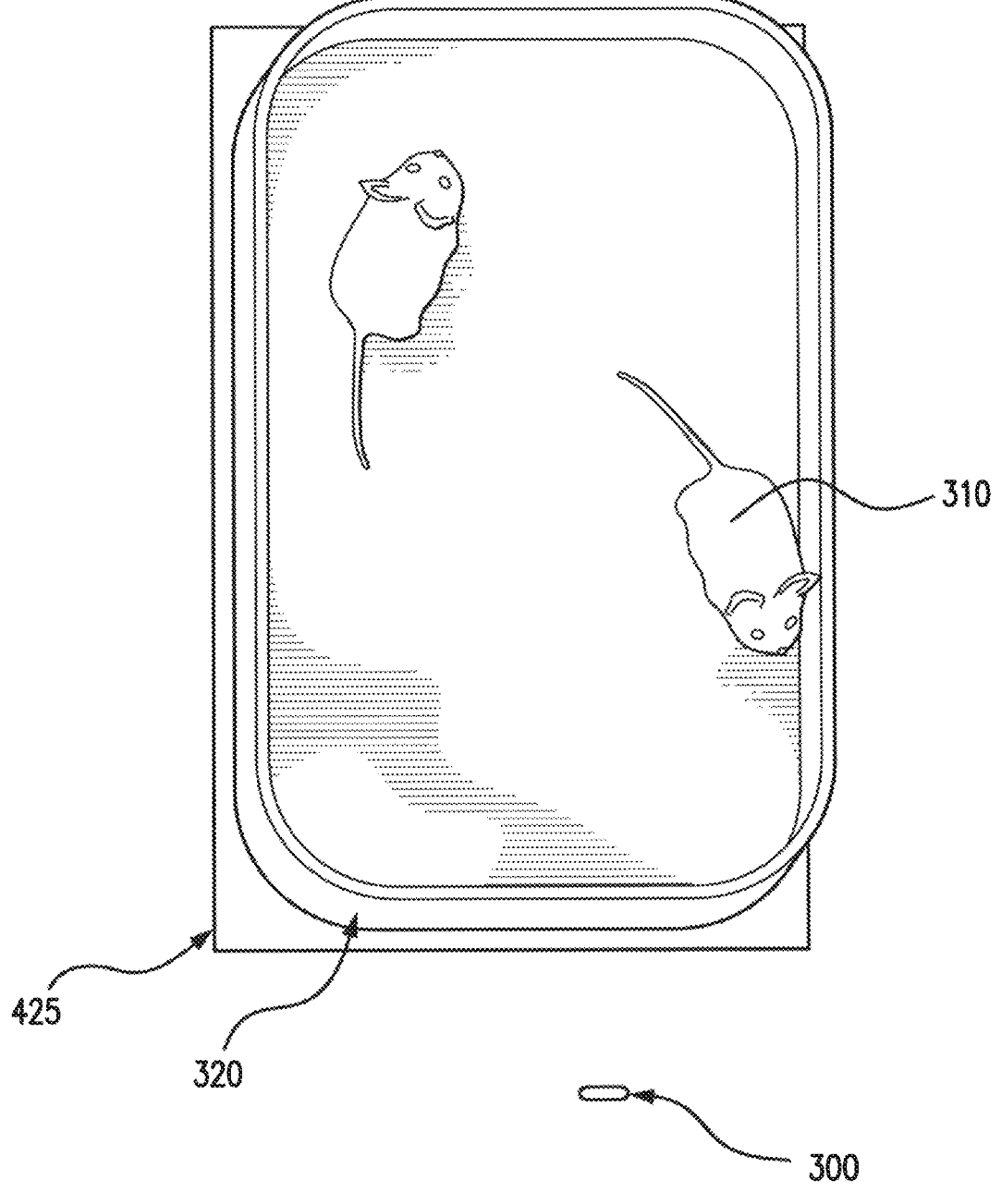
FIG. 3 depicts an animal containment structure integrated with a tracking apparatus of an illustrated embodiment.
Figure 4:
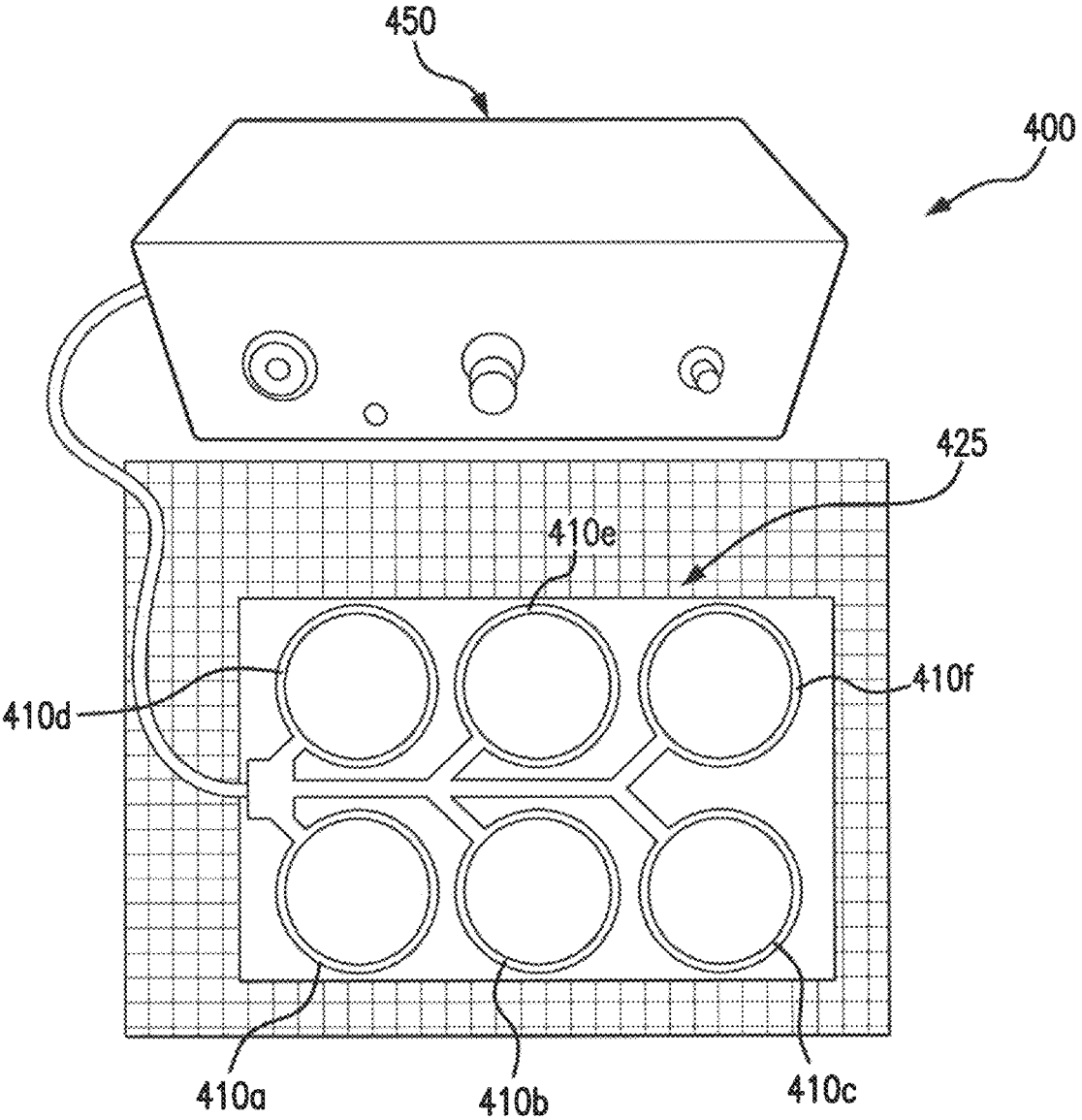
FIG. 4 depicts an animal tracking apparatus of an illustrated embodiment used in conjunction with the animal containment structure of FIG. 3 and coupled to an animal tracking computer system.
Figure 5:
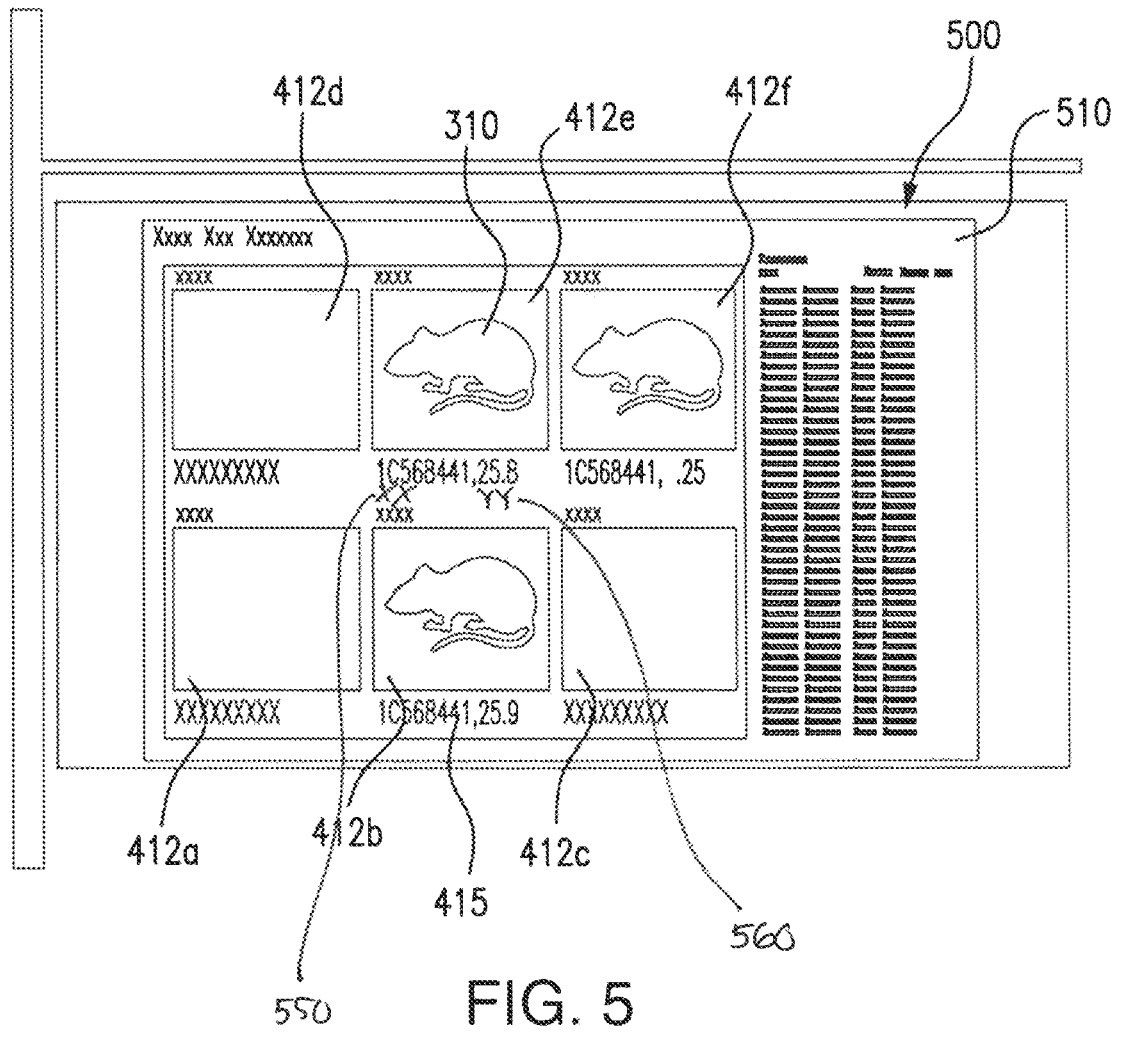
FIG. 5 depicts a GUI associated with the animal tracking computer system of FIG. 4 illustrating animal tracking.

Program/utility 240, having a set (at least one) of program modules 215, for carrying out the functionality of the illustrated embodiments of FIGS. 3-5, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. With reference now to certain embodiments of the present invention illustrated in FIGS. 3-5, it is to be appreciated that in accordance with the illustrated embodiments described herein for detecting and tracking motion of an animal, it is to be understood a tracking device 300 is to be associated with animals 310 (such as laboratory testing mice/rats). In accordance with the illustrated embodiments described herein, the tracking device 300 preferably consists of a capsule device configured to be inserted under the skin layer of an animal 310 (e.g., mice). Each capsule device 300 preferably emits a low frequency (LF) passive RFID identifier and includes thermometer device for recording and transmitting both an RFID identifier and a core body temperate of the associated animal 310. Preferably, the RFID identifier in each LF capsule 300 is software programmable so as to be programmed with an identifier (e.g., a serial number) that is uniquely associated with a particular animal 310. Thus, when a RFID scanning device (e.g., 450 (FIG. 4)

is used to transmit/receive RFID signals, the LF capsule device 300 when subject to that RFID signal emits a LF signal containing the unique RFID identifier of the capsule 300 as well as the core body temperature of the animal 310 the LF capsule 300 is associated with.

It is to be appreciated the LF capsule device 300 is not to be understood to be limited to the above described capsule device 300 as it may be encompassed/constructed in various configurations and attached to any suitable portion of an animal it is intended to be associated with. For instance, an RFID tag may be used that is attached to an ear of a rodent, such as a rat. The tag may be attached to the ear using any suitable structure. In some advantageous embodiments, the tag does not need to have a power source and may be used as a wireless device. In one some embodiments, the tag may comprise passive elements such as an inductive element and a capacitive element. It is to be appreciated that any suitable electrical structures may be used for the inductive and capacitive elements which provide suitable inductive and capacitive behavior characteristics suitable for carrying out the functionality of the illustrated embodiments as described herein.

With particular reference to FIG. 4, shown is a tracking system 400 consisting of a tracking apparatus 425 (tracking pad) communicatively coupled to tracking computer device 450. It is to be understood the tracking apparatus 425 may be communicatively coupled to the tracking device 450 through any known wired and wireless coupling methods for transmitting data there between. In accordance with the illustrated embodiment of FIG. 4, the tracking apparatus 425 preferably includes a plurality of scanning devices 410a-f, each individually configured and operable to track movement of an animal 310 located preferably in close proximity to a scanning device 410 of the tracking apparatus 425. It is to be understood for ease of illustration and description, tracking computer device 450 is shown coupled to a single tracking apparatus pad 425 in the illustrated embodiment of FIG. 4. It is to be understood and appreciated that the tracking device 450 is not to be understood to be limited to coupling to only a single tracking pad apparatus 425, rather it is to be understood and appreciated that the tracking device 450 is configured and operable to couple to a plurality of tracking pad apparatus' 425 in accordance with the description of the illustrated embodiments. Tracking device 450 is to be understood to include one or more components of the computer system 200 described above with reference to FIG. 2.

With reference now to FIGS. 3 and 4, the tracking apparatus 425 is preferably associated with an animal cage apparatus 320 for tracking movement of an animal 310 within the animal cage 320. As shown in the illustrated embodiment of FIG. 3, the tracking apparatus 425 is shown to be disposed below a bottom surface of the animal cage 320. However, it is to be appreciated that the tracking pad 425 may be disposed in various orientations relative to the animal cage 320 (e.g., above cage 320), and thus it not to be understood to be limited to being disposed below the animal cage 320.

As best illustrated in FIG. 3, the tracking pad 425 is shown disposed beneath an animal cage apparatus 320 configured to contain one or more animals 310. As shown in the illustrated embodiment of FIG. 4, the tracking pad 425 is configured in a planar pad structure dimensioned to preferably reside beneath the floor plane 325 of an animal cage 320. As further shown in the illustrated embodiment of FIG. 4, the tracking pad 425 includes a plurality of scanning apparatuses 410a-f. For illustrative purposes, six (6) scanning apparatuses 410a-f are shown included with the tracking pad 425, however it is to be understood the tracking pad 425 is not to be understood to be limited to the six (6) scanning apparatuses 410a-f shown, as more or less may be provided in accordance with the description herein.

Each scanning apparatus 410a-f preferably consists of a powered (active) RFID scanning device having a coupled antenna array, each being coupled to the tracking computing device 450 for both receiving power energizing the each RFID scanning apparatus 410a-f and sending data communication therebetween. In accordance with the illustrated embodiment, for instance, each RFID scanning apparatus 410a-f (e.g., an antenna array) may include a 134.2 kHz RFID reader coupled to a multiplexed main circuit board wherein the tracking pad 425 is configurable to implement 1-N number of antenna arrays 410. Each RFID scanning apparatus 410a-f is preferably configured and operable to detect location and temperature of an animal 310 (via RFID scanning of a tracking LF capsule device 300 associated with the animal (e.g., implanted within) 310). It is to be appreciated each scanning apparatus 410a-f is not to be understood to be limited to using an RFID antenna array for detecting presence and temperature of an animal, as any suitable wireless detection system may be implemented. It is to be further appreciated, that in accordance with an illustrated embodiment, the read speed for the tracking device 450 to acquire motion and temperature profile data from an animal is approximately 80 ms per read, but it is to be understood the illustrated embodiments are not limited thereto and may operate with any desirable read speed/ operating frequency.

As shown in the exemplary embodiment of FIG. 4, the tracking system 400 is configured to have six (6) separate RFID antenna scanning arrays 410a-f, each coupled to the tracking computer device 450. Hence, the floor portion 325 of the animal cage 320 is apportioned into six individual segments, each corresponding to an individual RFID antenna scanning array 410a-f. In accordance with the illustrated embodiments, the tracking computer device 450, in conjunction with the tracking pad 425, is configured and operable to detect and track movement/motion of an animal 310 from one apportioned region of the animal cage 320 to another apportioned region, wherein each apportioned region of the animal cage 320 is preferably associated with an individual scanning device 410a-f (e.g., an antenna array). Additionally, the tracking system 400 is further configured to the capture the temperature of each animal 310 having an associated LF tracking capsule device 300 in the animal cage 320, since in accordance with the illustrated embodiments, the each LF tracking capsule device 300 is operative to detect the temperature of an associated animal. The detected animal temperature data is then transmitted to a scanning device 410a-f the animal is located in close proximity to. Each scanning device 410a-f is then operative to transmit the detected animal temperature and ID information to the tracking computer device 450 for subsequent analytics.

With reference now to FIG. 5, the operability and functionality of the animal tracking device 450 is now provided. As mentioned above, device 450 is preferably operative and configured to communicate with an animal tracking pad 425 to electronically receive data indicative of an animal's 310 motion and temperature while disposed in an animal cage 320, preferably via an embedded LF capsule 300. Thus, the tracking device 450 is operative to create motion and temperature profiles for animals 310 disposed in an animal cage 320.

For instance, as shown in a GUI 500 generated by the tracking device 450, device 450 detects/records/displays when an animal 310 traverses from one individual section 412a-f of an animal cage 320 to another individual section 412a-f via interaction with a RFID tracking capsule 300 disposed in an animal 310 via an RFID scanning antenna device 410a-f located in proximity to the current position of that animal 310 in the animal cage 320. As shown in FIG. 5, (e.g., as displayed in window portion 510 of GUI 500) the tracking device 450 detects not only the current position of a certain animal 310 in cage 320, but also the unique RFID identifier 415 associated with the animal's embedded LF tracking capsule 300, as well as the current core body temperature of that animal 310 via the RFID scanning of the capsule 300 embedded in the animal 310 by a respective scanning antenna array 410a-f. Thus, it is to be appreciated that the RFID implanted LF chip/capsule 300 and a quadrant-based antenna array 410a-f of the tracking apparatus reader 400 preferably sends to software programmable tracking device 450 a date and time stamp, reader antenna, microchip ID and the animal's temperature. Using software tools a user preferably maps movement of the animals and graphs animal temperatures.

Figure 6:
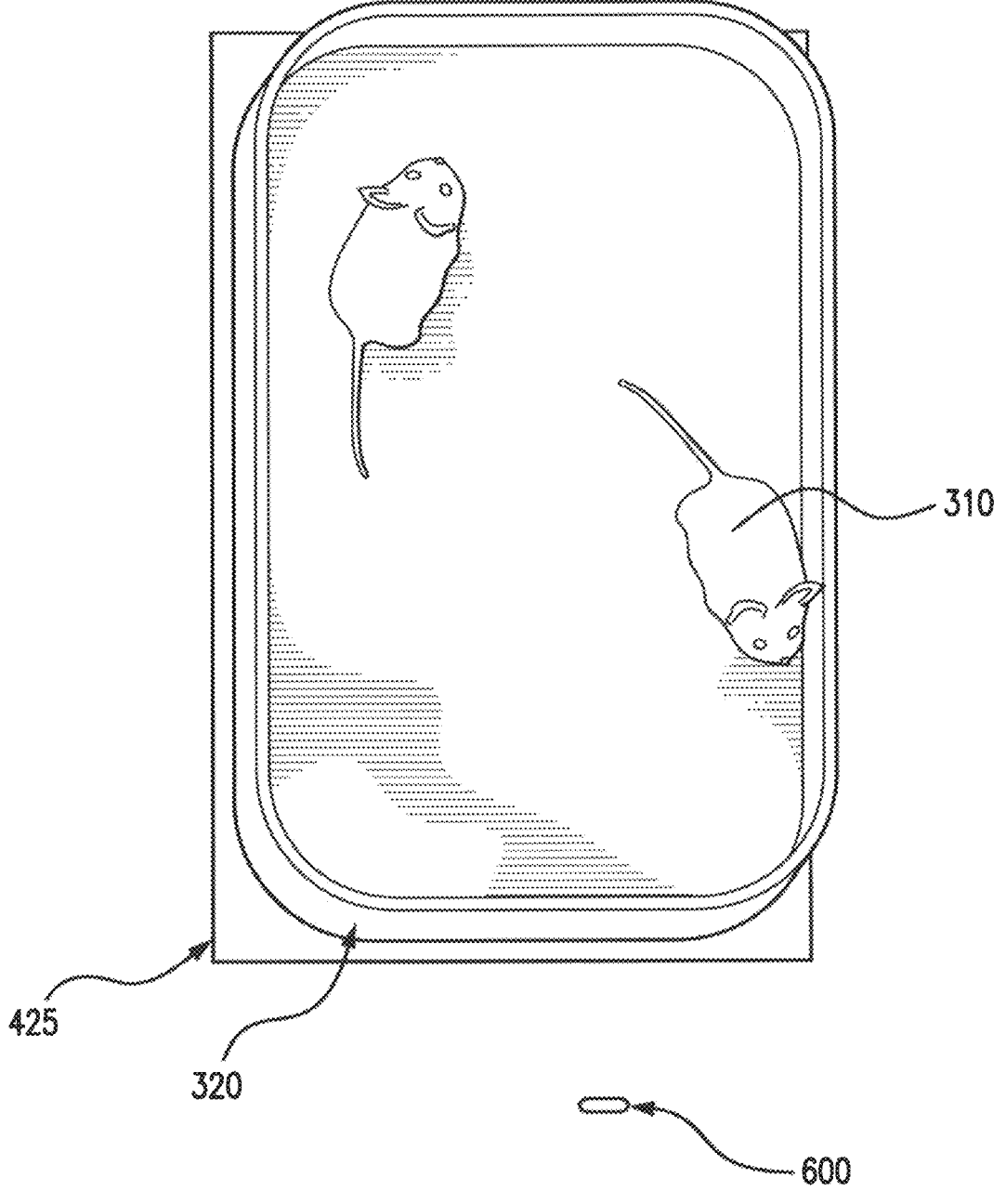
FIG. 6 depicts an animal containment structure integrated with a tracking apparatus cooperative with the detection component configured for enabling detection of a plurality of animals simultaneously located in a same individual region of a confined space in accordance with another illustrated embodiment.
Figure 7:
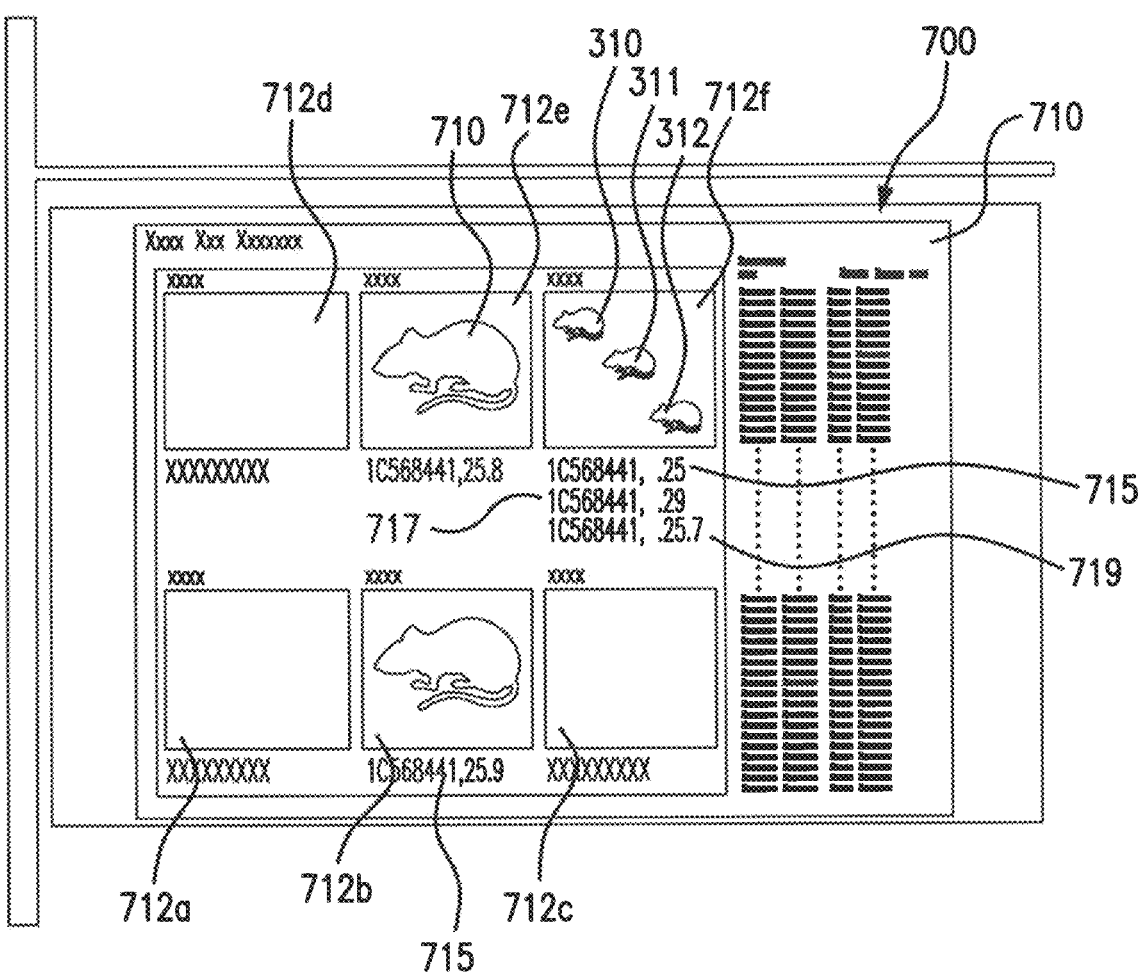
FIG. 7 depicts a GUI associated with the animal containment structure of FIG. 6 illustrating the simultaneous tracking of multiple animals in a same individual region of a confined space.

With reference now to FIGS. 6 and 7, shown is another preferred illustrated embodiment. As mentioned above, prior animal tracking systems did not permit the simultaneous tracking and recording/reading of multiple animals in a designated area having a single antenna array when a low frequency (LF) tracking chip is associated with an animal for movement tracking. This is principally because of the collision effect that occurs between multiple LF chips when all are simultaneously present in a designated area covered by a single antenna array. Typically, in this scenario, the antenna array only tracks the strongest signal (e.g., RFID) received from a single LF chip amongst all the LF chips simultaneously present in the designated region. Thus, in accordance with the present illustrated embodiments of FIGS. 6 and 7, a LF tracking capsule 600 is provided and associated with an individual animal 310 (e.g., preferably embedded within an animal as mentioned above), which LF tracking capsule is provided with anti-collision LF microchip(s) enabling the simultaneous reading of multiple animals by a single LF reader antenna (e.g., 410f) (as shown in FIG. 7) providing increased data capture and accuracy for motion detection. It is to be appreciated this is particularly advantageous at least because the combination of integrated circuits in the present LF capsules 600 and firmware provided in the tracking device 425 (FIG. 4) allows for anti-collision ability for simultaneous tracking multiple animals with a single antenna array, as shown and described below with reference to FIG. 7. An example of such an LF tracking capsule 600 provided with anti-collision LF microchips enabling the simultaneous reading of multiple animals on a single LF reader antenna is the "EL9265 RFID Temperature Sensor Transponder IC" commercially available from Excelio™, which is incorporated herein by reference.

Briefly, the LF tracking capsule 600 preferably consists of transponder integrated circuit (IC) that is a low-frequency (LF) RFID device having a built-in smart temperature sensor. LF capsule is preferably compliant with the ISO 11784/11785 standard, and responds to reader commands from tracking device 450 for single-point temperature measurement and a series of temperature measurements for providing data logging. LF tracking capsule 600 requires no external power supply or energy-storage capacitor as it operates in a passive mode. LF tracking capsule 600 preferably supports Bi-phase and Manchester encoding for down-link and up-link communication with tracking device 450. Data is preferably stored in a non-volatile EEPROM memory of 2,048 bits of capacity provided in each LF tracking capsule 600. The LF tracking capsule 600 communication timing protocol and command structure are preferably configured to support Reader Talks First (RTF) operation, including anti-collision algorithm, in conjunction with tracking device 450. The LF tracking capsule 600 is preferably constructed into a small form factor die configured to be accommodated into glass tube transponders (e.g., of size of 2.12 mm×12 mm), and also into mini-glass tube transponders of size of as 1.4 mm×8 mm so as to be embedded/implanted in mice 310 in accordance with the illustrated embodiments.

With reference now to FIG. 7, the operability and functionality of the animal tracking computer system device 450 utilizing the anti-collision LF tracking capsule 600 is now provided. As shown in a GUI 700 generated by the tracking device 450, device 450 detects/records/displays when an animal 710, or multiple animals 310-312, traverses from one section 412a-f of an animal cage 320 to another section 412a-f via interaction with a RFID tracking capsule 600 disposed in an animal via an RFID scanning antenna array 410a-f located in proximity with the current position of that animal in the animal cage 320. As shown in FIG. 7, (e.g., as displayed in window portion 710 of GUI 700) the tracking computer device 450 simultaneously detects not only the current position of multiple animals 310, 311 and 312 in a specified region of a cage 320 (e.g., 712f), but also the unique RFID identifiers 715, 717 and 719 (e.g., region 712f) associated with the animal's (e.g., 310, 311 and 312) embedded LF tracking capsules 600, as well as the current core body temperature of each animal 310, 311, 312, via the RFID scanning of the each anti-collision LF capsule 600 respectively embedded in each animal 310, 311 and 312 by a single scanning antenna array (e.g., 410f) in close proximity to a cage region (e.g., 712f). Thus, it is to be appreciated that the RFID implanted LF chip/capsule 600 and a quadrant-based antenna array 410a-f of the tracking system 400, in accordance with the illustrated embodiments of FIGS. 6 and 7, preferably sends to software programmable tracking device 450 a date and time stamp, reader antenna, microchip ID and the temperature for multiple animals (e.g., 310, 311, 312) simultaneously located in a designated region (e.g. 712f of cage 320) via a single antenna array (e.g, 410b). It is to be appreciated that while GUI 700 shows the simultaneous tracking of three (3) mice (310, 311, 312) in a designated region 712f of cage 320 along with their respective unique tracking ID no, and current core body temperature for ease of illustration purposes as the tracking system 400 of the current illustrated embodiment is to be understood to simultaneously track any number of mice in accordance with the capabilities of the tracking computer device 450.

It is to be appreciated that, in accordance with the illustrated embodiments, tracking device 450 is configured and operable to generate motion and temperature profiles for animals 310 located in an animal cage 320 over a prescribed period of time. For instance, the motion and temperature profile of an animal 310 may be viewed and analyzed for a 3 hr time period following the animal be subjected to a defined event (e.g., surgery, mediation, etc.). Additionally, threshold values may be prescribed for detected motion and temperature of one or more animals 310 such that when there is a prescribed deviation from a detected motion and/or temperature profile, a message (e.g., alert) may by generated and transmitted to one or more recipients indicating such deviation. The tracking device 450 may be further configured and operable, in accordance with the illustrated embodiments, to enable definition of subgroups of animals located in one or more animal cages 310, such that motion and temperature profiles are generated for each defined subgroup. For instance, one subgroup may consist of animals subject to medication A, while another subgroup may consist of animals subject to medication B. Hence, the tracking device 450 may be configured and operational to generate the average, mean and median values for the determined motion and temperature profiles of each defined animal subgroup so as to be utilized in subsequent laboratory analytics.

It is to be further appreciated and understood that additional embodiments of the tracking system 400 may further include self-learning/Artificial Intelligence (AI) for performing one or more of the animal tracking tasks described above (e.g., identifying and detecting animal movement and core and/or subcuticular body temperature in a confined space using a tracking apparatus 425). Thus, preferably integrated into the tracking device 450, which may be preferably communicatively coupled to a plurality of external databases/data sources is an AI system (e.g., an Expert System and/or Large Language Model System) that implements machine learning and artificial intelligence algorithms to conduct one or more of the above mentioned task relating to identifying and detecting animal movement and core and/or subcuticular body temperature in a confined space using a tracking apparatus 425. The AI system integrated with the tracking device 450 may include two subsystems: a first sub-system that learns from historical data; and a second subsystem to identify and recommend one or more parameters or approaches based on the learning. It should be appreciated that although the AI system may be described as two distinct subsystems, the AI system can also be implemented as a single system incorporating the functions and features described with respect to both subsystems.

It is to also be appreciated that in addition to conducting one or more of the above mentioned task relating to identifying and detecting animal movement and core and/or subcuticular body temperature in a confined space using a tracking apparatus 425, the AI may utilize integrated hardware and software systems that combine video tracking, depth sensing, machine vision and machine learning, for automatic detection and quantification of animal social behaviors. Thus tracking system 400 is further adapted to detect behaviors involving close and dynamic interactions between two animal (e.g., mice) subjects. For instance, the tracking system 400 system preferably utilizes hardware that integrates conventional video cameras that capture color or monochrome images with a depth sensor (or "depth camera"). The captured image data that includes depth information is then analyzed via an image processing pipeline, which extracts the body "pose" of individual subjects, and uses supervised machine learning to develop classifiers capable of classifying several well-described social behaviors. Unsupervised machine learning can also be used to gain insights into behaviors that may not be readily apparent based upon human observation.

Behavioral classification systems in accordance with the various illustrated embodiments perform behavioral classification by performing 3D tracking of one or more subjects. In several embodiments, position and pose information is passed through a set of feature extractors to obtain a low-dimensional representation from which machine learning algorithms can be used to train classifiers to detect specific behaviors. In other embodiments, the raw position and pose information can be passed directly to the classifier. Using feature extraction, however, can remove uninformative sources of variability from the raw video data and reduce susceptibility of the classifier to overtraining, producing automated behavioral annotations that are accurate and robust. In several embodiments, supervised learning is utilized to detect behaviors that are recognizable by human observers. In many embodiments, unsupervised learning is utilized to detect clusters of behaviors that provide meaningful information concerning the behavior of subjects that may not have otherwise been readily apparent to a human observer.

For instance, a process for performing behavior detection using 3D tracking in accordance with the illustrated embodiments include acquiring image data including depth information. One or more subjects are identified within the individual frames of image data and the pose of the identified subjects determined. Utilizing pose information across a sequence of frames, the animal subjects can be tracked in 3D over time. Classifier performance can be enhanced by extracting a low dimensional feature set that enables classifiers utilized in accordance with different illustrated embodiments to achieve high levels of discrimination between different types of behavior. It should be appreciated that behavioral classification systems in accordance with the illustrated embodiments are not limited to the use of any specific feature set. The specific choice of feature set is largely determined by the captured image data and the requirements of a given application. In other illustrated embodiments, classification can be performed based upon raw image data, detected pose and raw 3D trajectory information, and/or any combination of raw data, pose data, trajectory data, and/or parameters appropriate to the requirements of a specific application. A set of parameters that forms a low dimensional representation of the tracked subjects in 3D is provided to a set of one or more classifiers that discriminate between one of a number of different behaviors (including a "no behavior of interest state"). Behavioral classification systems described herein utilize the detected behaviors to generate an output (e.g. alerting a user to detection of aggressive behavior). In several illustrated embodiments, the detected behaviors are utilized to perform high level behavior analysis. For example, a sequence of detected behaviors may be provided to one or more classifiers trained to detect patterns of behavior related to higher level objectives (e.g. a subject attempting to achieve a goal such as, but not limited to, defending territory, or mating), or the manifestation of a specific behavioral phenotype. As can readily be appreciated, the uses to which detected behavior data can be applied are varied and many applications involving the use of detected behavior data are discussed in detail below.

With specific regard to the use of behavioral classification systems to detect social behavior in mice, it is to be appreciated that the manner in which behavioral classification systems can be utilized in the classification of behaviors and specifically in the challenging task of classifying social behaviors by tracking multiple subjects in 3D can be illustrated by considering experimental results obtained using a specific behavioral classification system designed to detect social behaviors in pairs of mice that are tracked using depth information. Social behaviors are considered especially hard to quantify, because they require separating and maintaining the identities, positions and orientations of at least two different subjects, during close and dynamic interactions. This is made particularly difficult by occlusion when the mice subjects are close together (e.g., in a cage apparatus 320). Most social behaviors in mice occur when the animals are in proximity to each other. In the case of mice, social behavioral assays are ideally performed in the home cage, where bedding absorbs familiar odors and allows digging, nesting and other activities. The fact that bedding is textured and may be rearranged by the mice presents additional challenges for object-background discrimination, tracking and pose estimation. The ability of the behavioral classification system discussed below to observe a mouse in its home environment is particularly relevant to behavioral classification, because removing the mouse from its home cage to a novel, bare cage that is specifically designed to facilitate machine vision algorithms introduces a source of stress to the mouse. In applications such as (but not limited to) pharmaceutical screening, results can be biased due to aberrations in behavior that may be the result of stress and not a product of administration of the pharmaceutical.

A major advantage of the behavioral classification system utilized to obtain the experimental data discussed below is the increased throughput and decreased labor-intensiveness of performing the behavioral classification. Behavioral classification systems similar to the behavioral classification system described below can reduce time requirements for analysis to an initial commitment of several hours to manually generate a training set of annotations and a few minutes to train the classifier, after which large numbers of additional videos can be scored in a matter of minutes. This not only eliminates major bottlenecks in throughput, but can improve the statistical power of behavioral studies by enabling larger sample sizes; this is often a problem for behavioral assays which typically exhibit high variance. Methods of behavior detection in accordance with various illustrated embodiments also open up the possibility of using behavioral assays as a primary, high-throughput screen for drugs or gene variants affecting mouse models of disorders that involve aberrant social interactions, such as (but not limited to) autism, Schizophrenia, depression, anxiety, and/or PTSD.

While the discussion of using behavioral classification systems to detect social behavior in mice is only one of many possible ways in which behavioral classification systems in accordance with the illustrated embodiments can be utilized, the example aptly illustrates the effectiveness of behavioral classification systems in detecting social behavior in multiple subjects that are small and exhibit behaviors that involve rapid movement. Furthermore, the example highlights how data collected using behavioral classification systems can be utilized to characterize behavioral phenotypes associated with a specific genotype of observed subjects. As such, experiments involving the use of behavioral classification systems to detect social behavior in mice validate the effectiveness of using behavioral classification systems in accordance with various illustrated embodiments to perform screening of pharmaceuticals, and/or as a diagnostic tool to assist with detection of a genotype that may be associated with an observed behavioral phenotype in any species of subject. Accordingly, similar behavioral classification systems can be more generally adapted for use in performing behavioral detection with respect to rodents. In addition, modifications to the described pose estimation processes involving fitting skeletons to observed subjects can be used in behavioral classification systems designed to classify the behaviors (including social behaviors) of any of a number of endoskeletal animals including additional rodent species (e.g., rats, hamsters, guinea pigs), non-human primates and/or humans. Accordingly, behavioral classification systems in accordance with various illustrated embodiments are not limited to detection of specific types of behavior and/or detection of behaviors exhibited by specific species of subjects. The examples discussed below with respect to mice are readily generalizable through use of appropriate pose estimators and training data sets to any of a variety of behaviors in any of a number of different endoskeletal animals.

Figure 8:
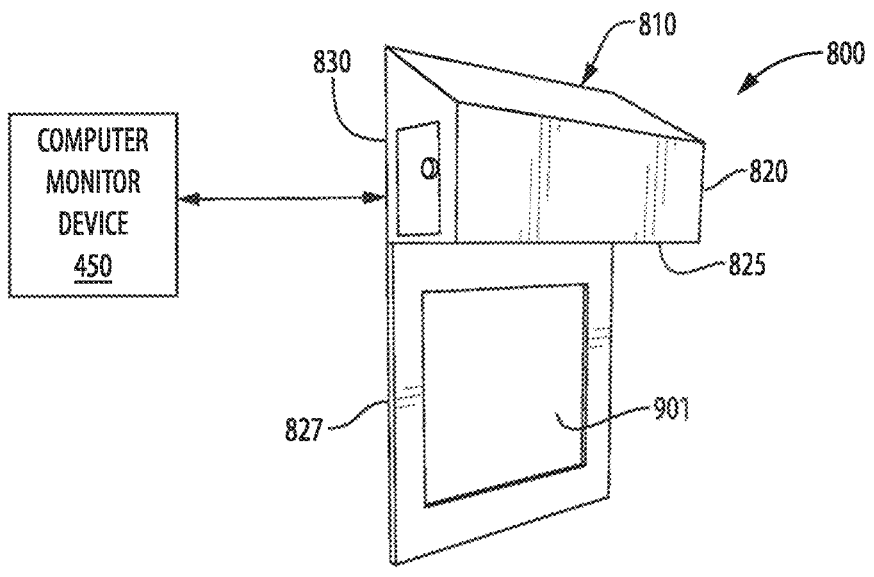
FIG. 8 depicts a perspective view of an animal passageway detection device in accordance with the illustrated embodiments.
Figure 9:
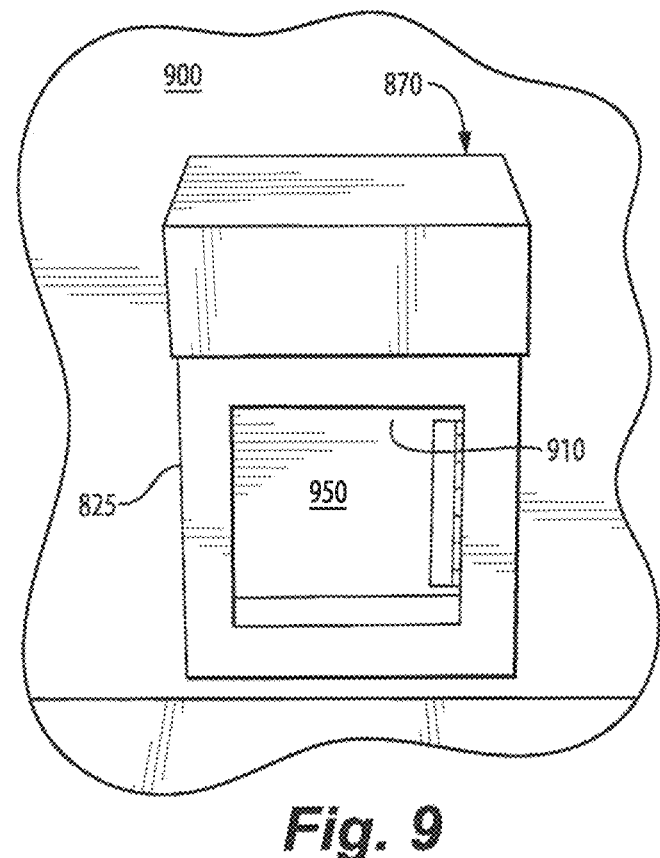
FIG. 9 depicts frontal view of the animal passageway detection device of FIG. 8 mounted adjacent a passageway.

With reference now to FIGS. 8 and 9, and in accordance with another illustrated embodiment, shown is a passageway tracking system 800 consisting of a passageway detection device 810 communicatively coupled to a tracking computer monitor device, such has computer tracking device 450, as shown and described above with reference to FIG. 4. It is to be understood the detection device 810 may be communicatively coupled to the computer tracking device 450 through any known wired and wireless coupling methods for transmitting data there between. Further, the detection device 810 includes a housing portion 820 that preferably includes an antenna array 825, such as shown in FIG. 4, with reference to the antenna array of the tracking pad 425. The housing portion 820 may be constructed from any suitable material, such as metal, plastic and the like. Additionally, the housing portion 820 may also include the computer tracking device 450. For ease of description purposes, the above description provided for tracking pad 425 is to be incorporated for antenna array 825. It is to be further appreciated that while in the illustrated embodiment of FIGS. 8 and 9 the detection device 810 is shown disposed above a passageway 910, it is not to be understood to be limited thereto, as the detection device 810 in other embodiments is mounted beneath the passageway 910, and/or adjacent a side portion of the passageway 910.

As described herein, tracking system 800 is configured and operative for identifying and monitoring passage of a plurality of animals 310 through a passageway 910. As shown in FIG. 9, the detection device 810 is preferably mounted to a wall member 900, and adjacent to a passageway 910 extending through the wall member 900 through which a plurality of animals 310 traverse through. The housing portion 820 of the detection device 810 preferably projects outwards relative to the wall member 900 it is affixed to. The detection device 810 may further preferably include a frame portion 827 preferably extending beneath the housing portion 820, which defines an open region affixed adjacent the passageway 910. As described further below, the passageway 910 may further include a door member 950 that is preferably mechanically actuated (e.g., by a servo motor) so as to be controllable by the computer monitoring device 450. It is to be appreciated, any suitable means (e.g., bolts, screws and the like) may be used to affix the detection device 810 to the wall member 900, as shown in FIG. 9.

In accordance with the illustrated embodiment of FIG. 4, the antenna array 825 preferably includes one or more antennas 410*a-f*, each individually configured and operable to track movement of an animal 310 located preferably in close proximity to the detection device 810 of the antenna array 825 relative to the passageway 910. Thus, the antenna array 825 is configured to detect identification data from a respective detection component (e.g., 300, 600) respectively associated with each of the plurality animals 310 when located in close proximity to the passageway 910. As mentioned above, the detected identification data includes a unique ID associated with the animal 310 wherein each detection component preferably consists of a capsule device 300, 600 configured to be located internal of an animal 310.

As shown in FIGS. 8 and 9, the housing portion 820 of detection device 810 is shown to include at least one antenna element (e.g., consisting of an antenna array 825) extending above the animal passageway 910. It is to be understood and appreciated that antenna element 825 is not to be limited to be mounted above the passageway 910, as it may likewise by located beneath the passageway 910, or about a side portion of the passageway 910 in alternative embodiments providing the same functionality as described herein when mounted above a passageway 910 as shown in FIGS. 8 and 9. The housing portion 820 of detection device 810 also preferably includes an lockable access door 830 for enabling user access to the internal cavity portion defined by the housing portion 820, which preferably include the antenna array 825 and network coupling components for communicatively coupling the antenna array 825 to the computer monitoring device 450.

As mentioned above, the processor of the computer monitoring device 450 is preferably configured to receive the detected identification data of an animal 310 from the detection device 300, 600 so as to record in a database the detected animal's unique ID in correlation with a date/time stamp of the animal's 310 detected close proximity to the passageway 910. As also mentioned above, the passageway 910 may include a mechanically actuated door 950 controllable by the processor of the monitoring device 450 wherein the monitoring device 450 is configured to cause the door 950 to open for permitting passage of an animal 910 through the door 950 upon detection of an animal's detection component 300, 600.

In some embodiments, the identification data further includes health data related to an animal 310 whereby the monitoring device 450 is further configured to record in a database (e.g., database 234) both the detected animal's unique ID and heath data (e.g., core and/or subcuticular body temperature, heart rate, glucose level, etc.) associated with an animal's detection component 300, 600 when located in close proximity to the passageway 910. The computer monitoring device 450 in some embodiments is then further configured to cause a door 950 to open for permitting passage of an animal 310 through the door 950 contingent upon: either the detected unique ID associated with the animal 310, or both the 1) detection of the unique ID associated with the animal 310 and 2) the detected health data associated with the animal 310. In some embodiments, the computer monitoring device 450 is further configured to maintain the door 950 in either an open or closed position contingent upon the detected health data associated with the animal (e.g., if an animal 310 is detected to have a high body temperature, the door 950 will not open when the animal 310 is detected to be in close proximity to the door 950). The computer monitoring device 450 is some embodiments is further configured to send an electronic notification to a certain recipient (e.g., animal owner, clinic, etc.) providing notification of the animal's 310 detected high temperature so as to mitigate contamination of other animals located on the other side of the closed door 950.

As also mentioned above, in some embodiments, the detection device 600 implanted in an animal 310 is configured to simultaneously enable detection of identification data associated with each of a plurality of animals simultaneously located in close proximity to the passageway 910. For instance, the capsule device 600 includes a low frequency microchip having anti-collision capabilities relative to other capsule devices 600 implemented in other animals 310.

In accordance with the illustrated embodiments of FIGS. 8 and 9, the antenna element 425 may consist of a single antenna array (e.g., 410a, FIG. 4), or may consist of a plurality of antennas (e.g., 410a-410f, FIG. 4). In embodiments having an antenna element 425 consisting of a plurality of antennas (e.g., 410a-410f, FIG. 4) the monitoring device 450 is enabled and configured to detect a travel direction of the animal's 310 motion relative to the passageway 910 via movement relative to the plurality of antenna elements (e.g., 410a-410f, FIG. 4). For instance, the monitoring device 450 is enabled to track ingress and egress movement of an animal 310 relative to a passageway 910 and/or door 950 associated with the passageway 910. The monitoring device 450 is further configured to record in the database (e.g., 234) such detected travel direction of the animal 910. In some embodiments, the monitoring device 450 is further configured to cause the door 950 to open (via actuation of a mechanically operated door actuator, via control of an associated servo motor) for permitting passage of an animal 310 through the door 950 contingent upon the detected ID and travel direction associated with the animal 310. For instance, when a certain type of animal 310 (as determined by the aforesaid detected unique ID associated with the animal 310) is determined to be approaching the door 950, the door 950 is caused to be opened via a control signal transmitted from the monitoring device 450 to an electrically operated mechanically operated actuator coupled to the door 950. Additional to using an animal's unique ID for determining whether a passageway door 950 is determined to be opened, the animal's health data may also be considered for such a determination. For instance, only animal's 310 having a detected core and/or subcuticular body temperature within a prescribed range may be determinative by the monitoring device 850 as to whether an animal 310 is permitted passage through the passageway 910 (via opening of the door 950), which or may not also be determinative upon an animals 310 detected unique ID. For instance, only certain types of animals 310 (as determined by their associated unique ID) having a certain detected health data (e.g., having a prescribed core and/or subcuticular body temperature) are permitted passage through the passageway 910 (via opening of the door 950). For instance, in some embodiments, this reduces the likelihood of sick, or otherwise health compromised animals 310 from passing through the passageway 910.

In yet other illustrated embodiments, the monitoring device 450 is further configured to display on a computer monitor a GUI 500 (FIG. 5) illustrating a graphic representative of an animal 310 having a detection component 310 in association with its unique ID (415), motion XX (550) and temperature YY (560) data when located in close proximity to the passageway 910. And as shown in FIG. 7, the monitoring device 450 is configurable to simultaneously track multiple animals 310, 311, 312 on a GUI 710 when the animals (310, 311, 312) are preferably provided with an aforesaid LF tracking capsule 600.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of the illustrated embodiments, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for identifying and monitoring passage of a plurality of animals in a passageway, comprising:

a computer monitoring device having a processor and memory;

a detection device, communicatively coupled to the computer monitoring device, the detection device having a housing portion positioned in proximity to an animal passageway extending through a wall member, the detection device including:

an antenna element configured to detect identification data from a respective detection component respectively associated with each of the plurality animals when located in close proximity to the passageway, wherein the detected identification data includes a unique ID associated with the animal wherein each detection component consists of a capsule device configured to be located internal of an animal;

wherein the processor of the computer monitoring device is configured to receive the detected identification data of an animal from the detection device so as to record in a database the detected animal's unique ID in correlation with a date/time stamp of the animal's detected close proximity to the passageway.

2. The system as recited in claim 1, wherein the passageway includes a door controllable by the processor of the computer monitoring device wherein the processor is configured to cause the door to open for permitting passage of an animal through the door upon detection of an animal's detection component.

3. The system as recited in claim 2, wherein the identification data further includes health data related to the animal whereby the processor is further configured to cause the door to open for permitting passage of an animal through the door contingent upon: 1) detection of the unique ID associated with the animal and 2) the detected health data associated with the animal, and wherein the processor is further configured to maintain the door in either an open or closed position contingent upon the detected health data associated with the animal.

4. The system as recited in claim 1, wherein the identification data further includes health data related to an animal whereby the processor is further configured to record in the database both the detected animal's unique ID and heath data associated with an animal's detection component when located in close proximity to the passageway.

5. The system as recited in claim 4, wherein the health data includes an animal's core and/or subcuticular body temperature.

6. The system as recited in claim 1, wherein the detection device includes a plurality of antenna elements whereby the processor is configured to detect a travel direction of the animal's motion relative to the passageway via movement relative to the plurality of antenna elements whereby the processor is further configured to record in the database the detected travel direction of the animal.

7. The system as recited in claim 6, wherein the passageway includes a door controllable by the processor of the computer monitoring device wherein the processor is configured to cause the door to open for permitting passage of an animal through the door contingent upon the detected ID and travel direction associated with the animal.

8. The system as recited in claim 6, wherein the identification data further includes health data related to the animal whereby the processor is further configured to record in the database the detected travel direction of the animal in association with the animal's health data.

9. The system as recited in claim 8, wherein the processor is further configured to cause the door to open for permitting passage of an animal through the door contingent upon the detected: 1) ID, 2) travel direction and 3) health data associated with the animal.

10. The system as recited in claim 9 wherein the processor is further configured to display on a computer monitor a UI illustrating a graphic representative of an animal having a detection component in association with its unique ID, motion and temperature data when located in close proximity to the passageway.

11. The system as recited in claim 1, wherein the detection device is configured to simultaneously detect identification data from a respective detection component respectively associated with each of a plurality of animals simultaneously located in close proximity to the passageway.

12. The system as recited in claim 11, wherein the capsule device includes a low frequency microchip having anti-collision capabilities relative to other capsule devices.

13. The system as recited in claim 1, wherein each detection component includes an RFID detection element.

14. The system as recited in claim 13, wherein each RFID detection element is configurable to be programmed with a unique identifier identifying the animal it is associated with.

15. The system as recited in claim 1, wherein the detection device is disposed either above, adjacent a side portion or below the passageway.

16. The system as recited in claim 1, wherein the detection device is configured to simultaneously detect identification data from a respective detection component respectively associated with each of a plurality of animals simultaneously located in close proximity to the passageway whereby each capsule device includes a low frequency microchip having anti-collision capabilities relative to other capsule devices.

17. A system for identifying and monitoring passage of a plurality of animals in a passageway, comprising:

a computer monitoring device having a processor and memory;

a detection device, communicatively coupled to the computer monitoring device, the detection device having a housing portion positioned in proximity to an animal passageway extending through a wall member, the detection device including:

a plurality of antenna elements configured to detect identification data from a respective detection component respectively associated with each of the plurality animals when located in close proximity to the passageway, wherein the detected identification data includes a unique ID associated with the animal wherein each detection component consists of a capsule device configured to be located internal of an animal; and wherein the processor of the computer monitoring device is configured to receive the detected identification data of an animal from the detection device so as to determine an animal's direction of travel relative to the passageway to record in a database the detected animal's unique ID and determined direction of travel in correlation with a date/time stamp of the animal's detected close proximity to the passageway.

18. The system as recited in claim 17, wherein the passageway includes a door controllable by the processor of the computer monitoring device wherein the processor is configured to cause the door to open for permitting passage of an animal through the door contingent upon the detected ID and travel of direction associated with the animal.

19. The system as recited in claim 17, wherein the identification data further includes health data related to an animal whereby the processor is further configured to record in the database both the detected animal's unique ID, direction of travel and heath data associated with an animal's detection component when located in close proximity to the passageway.

20. The system as recited in claim 17 wherein the processor is further configured to display on a computer monitor a UI illustrating a graphic representative of an animal having a detection component in association with its unique ID, direction of travel and temperature data when located in close proximity to the passageway.

\* \* \* \* \*